United States Patent
Voss et al.

(10) Patent No.: US 6,729,952 B2
(45) Date of Patent: May 4, 2004

(54) REPLACEABLE FEED SEGMENT FOR THE BEATER OF A COMBINE HARVESTER

(75) Inventors: Douglas A. Voss, Wichita, KS (US); Robert Honas, Newton, KS (US)

(73) Assignee: Agco Corporation, Duluth, GA (US)

(*) Notice: Subject to any disclaimer, the term of this patent is extended or adjusted under 35 U.S.C. 154(b) by 0 days.

(21) Appl. No.: 10/300,945

(22) Filed: Nov. 20, 2002

(65) Prior Publication Data

US 2003/0073470 A1 Apr. 17, 2003

Related U.S. Application Data

(63) Continuation of application No. 09/875,064, filed on Jun. 6, 2001.

(51) Int. Cl.⁷ .............................................. A01F 12/22
(52) U.S. Cl. ............................................ 460/71; 460/73
(58) Field of Search .............................. 460/71, 72, 73, 460/74, 75, 66, 79, 80, 59

(56) References Cited

U.S. PATENT DOCUMENTS

| | | | |
|---|---|---|---|
| 5,229 A | 8/1847 | Anthony | |
| 376,552 A | 1/1888 | Rossler | |
| 376,652 A | 1/1888 | Rossler | |
| 640,939 A | 1/1900 | Paul | |
| 1,790,663 A | 2/1931 | Hill | |
| 2,301,536 A | 11/1942 | Greenwood et al. | |
| 3,036,486 A * | 5/1962 | Wilcox | 83/671 |
| 3,555,790 A | 1/1971 | Quick | |
| 3,762,537 A | 10/1973 | Lutz | |
| 3,964,492 A | 6/1976 | Crego | |
| 4,170,235 A | 10/1979 | Ashton et al. | |
| 4,209,024 A | 6/1980 | Powell et al. | |
| 4,398,607 A | 8/1983 | Reichardt | |
| 4,399,825 A | 8/1983 | Raineri | |
| 4,478,226 A | 10/1984 | Tophinke | |
| 4,492,237 A | 1/1985 | Pakosh | |
| 4,972,665 A * | 11/1990 | Hicks | 56/14.5 |
| 5,112,279 A | 5/1992 | Jensen et al. | |
| 5,342,239 A | 8/1994 | West et al. | |
| 5,368,522 A | 11/1994 | Ricketts et al. | |
| 6,092,750 A * | 7/2000 | Kooima et al. | 241/101.76 |
| 6,503,143 B2 | 1/2003 | Gerber et al. | |
| 2002/0016192 A1 | 2/2002 | Moster et al. | |
| 2002/0103015 A1 | 8/2002 | Gerber et al. | |

FOREIGN PATENT DOCUMENTS

DE      3214161 C2      10/1983

* cited by examiner

*Primary Examiner*—Robert E. Pezzuto
*Assistant Examiner*—Meredith Petravick
(74) *Attorney, Agent, or Firm*—Hovey Williams LLP

(57) ABSTRACT

The rotary beater has a number of untwisted, flat, feeding plate segments angularly disposed about its periphery. The plates are arranged in a left-hand group and a right-hand group so oriented that they converge the crop material centrally as they feed and accelerate the crop material rearwardly toward and through the inlet of an axial flow threshing rotor assembly. The feeding segments of each group are arranged in diametrically opposed sets containing at least one segment each, and the sets of one group are offset circumferentially 90° from the sets of the other group. Each segment has a hardened crop-engaging face, and the segments are all detachably bolted to the drum of the beater to facilitate removal and replacement when worn or damaged.

3 Claims, 3 Drawing Sheets

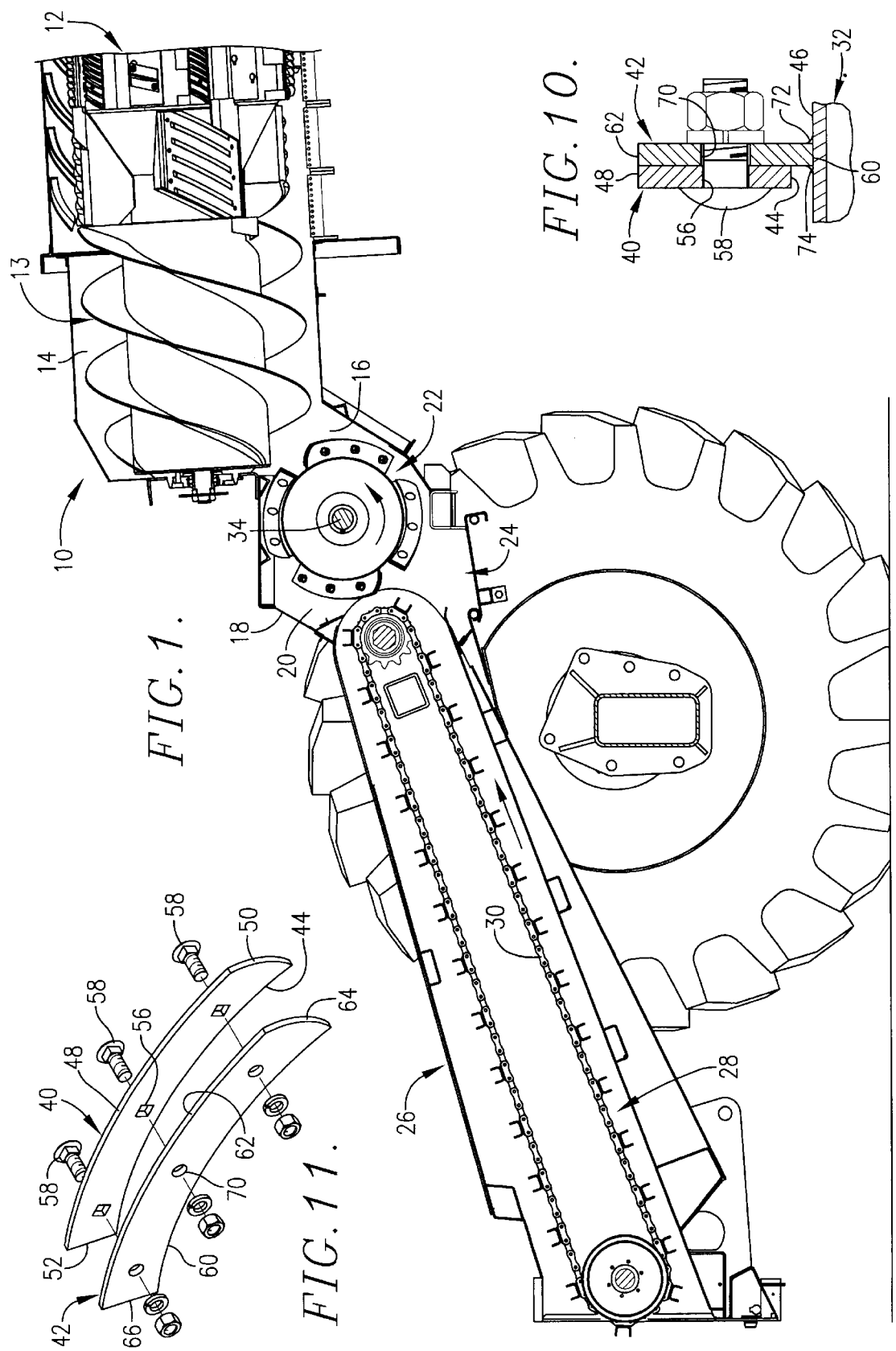

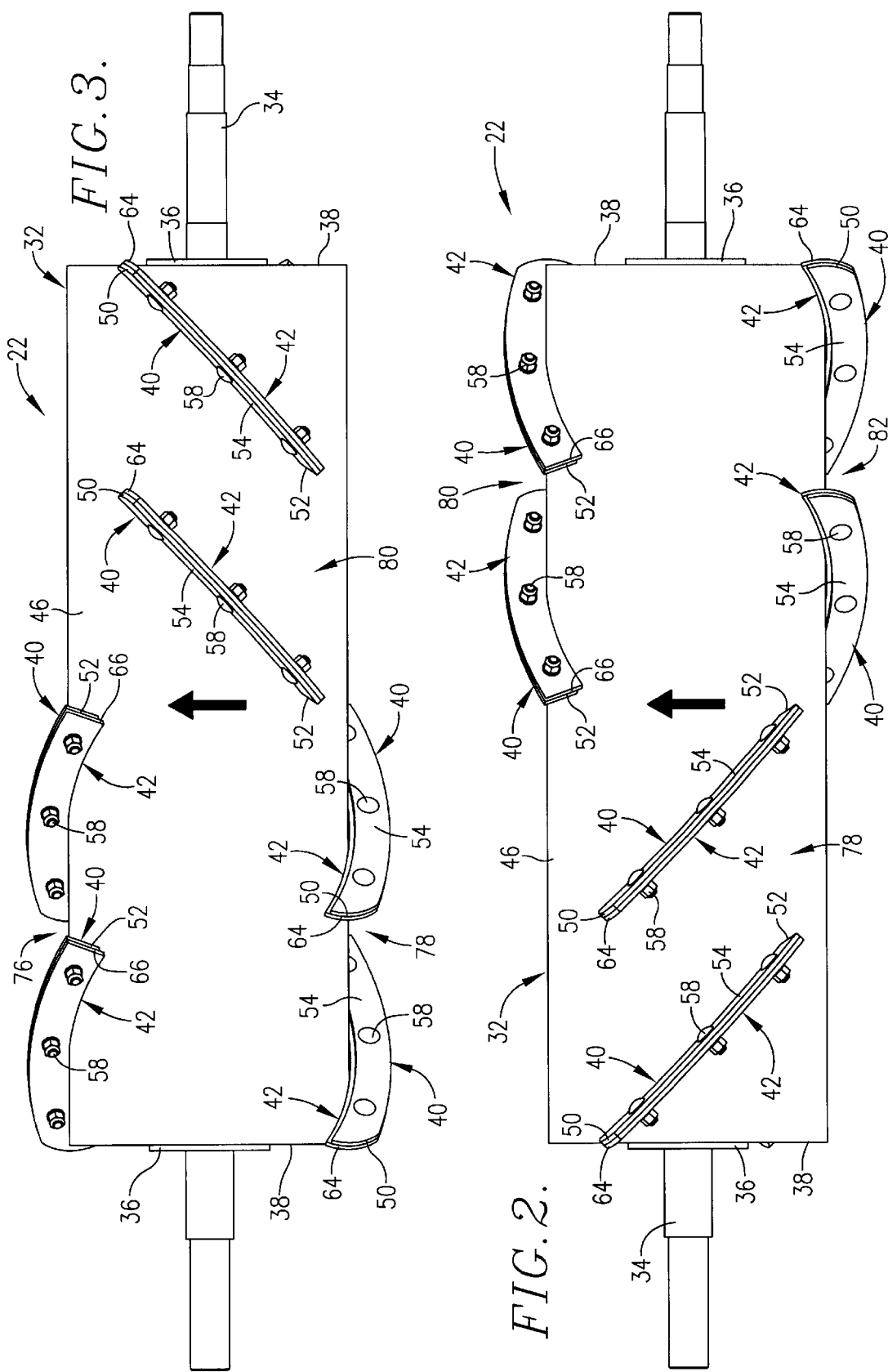

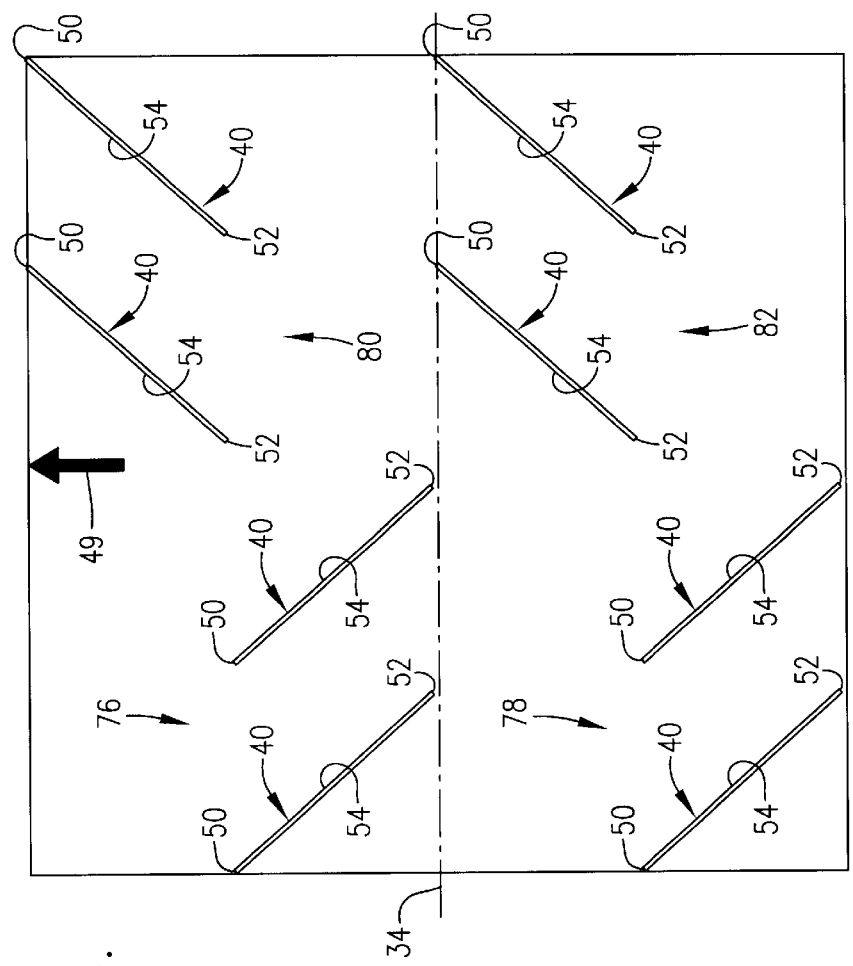
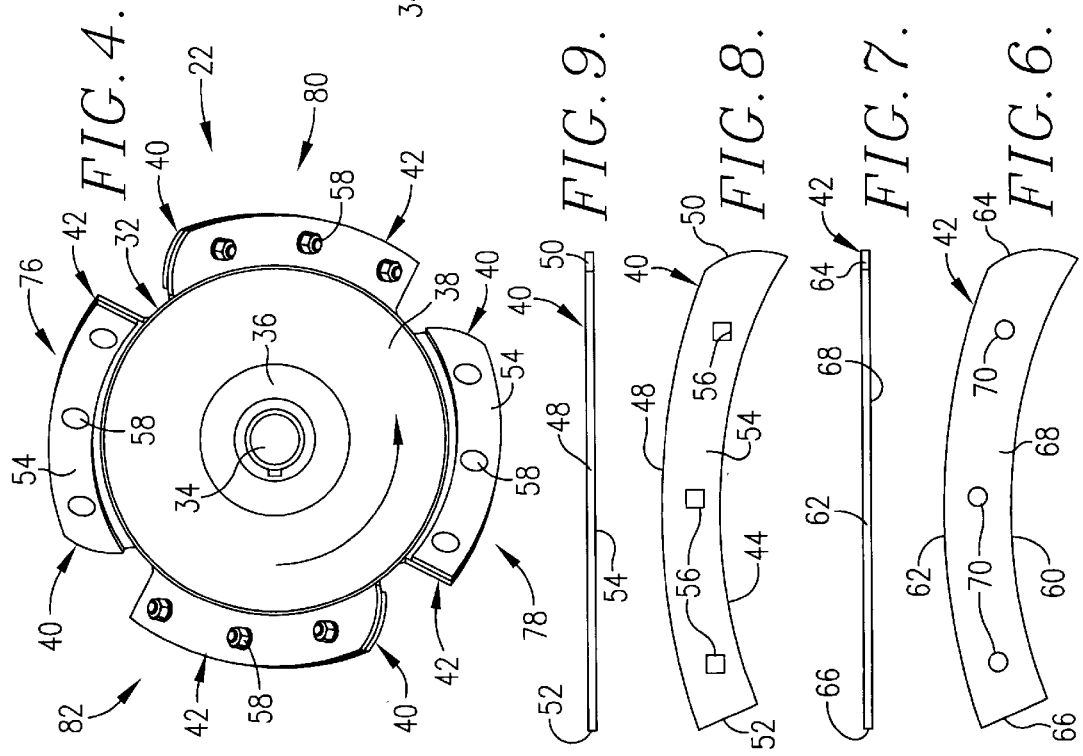

REPLACEABLE FEED SEGMENT FOR THE BEATER OF A COMBINE HARVESTER

CROSS REFERENCE TO RELATED APPLICATION

This application is a continuation of co-pending application Ser. No. 09/875,064 filed Jun. 6, 2001 in the names of Voss, et al. titled Beater for a Combine Harvester.

TECHNICAL FIELD

The present invention relates to combine harvesters and, more particularly, to an improved beater for transferring incoming crop material from the feeder housing to the inlet of the threshing rotor of an axial flow combine.

BACKGROUND

A variety of beater designs are currently used on commercially available combines. For example, some beaters utilize straight bars, plain or serrated, that run the full longitudinal length of the beater and extend at right angles to the flow path so as to aggressively feed the crop materials. Others utilize claws, pegs, teeth, strips, helical vanes, and various combinations of the foregoing, most at swept back angles. Helical, center-gathering vanes or auger flighting are often used to help converge the material centrally as it is propelled into the narrower inlet of the threshing rotor.

One problem with current designs is that they only efficiently convey limited crop types in limited conditions. Moreover, some beater types are so aggressive that they propel corn cobs at high velocity against interior walls of the combine, creating an extremely noisy working environment for the operator, and potentially causing seed or machine damage. Some beaters tend to wrap and recycle crop materials more than others; some tend to feed high moisture content materials in bunches rather than separate it thoroughly to provide even threshing; some handle viney materials more efficiently than others; and some are not particularly effective at feeding granular materials.

SUMMARY OF THE INVENTION

The present invention provides an infeed beater that performs more efficiently in extended crop types and conditions. Its function is to receive the crop material from the raddle feed chain and accelerate and transfer it to the inlet flighting of the threshing rotor. It provides for smooth, even crop feeding with minimal wrap around and recycling, even in high moisture content conditions. At the same time, it serves to converge the crop materials centrally to ease their entry into the inlet of the threshing rotor assembly. Furthermore, the beater of the present invention provides for relatively quiet operation, with reduced cob velocities when harvesting corn.

In one preferred embodiment, the present invention comprises a beater in which the cylindrical body of the device has a number of angled feeding segments distributed along its length and about its circumference. The segments each comprise a flat, untwisted plate that has a generally arcuate overall configuration, presenting an inner arcuate edge and an outer arcuate edge that is substantially concentric with the inner edge. The arcuate nature of the inner edge allows the plate to be disposed angularly on the periphery of the body or drum of the beater so as to partially wrap around the drum while also extending longitudinally along the surface of the drum. Each plate is provided with a hardened, crop-engaging face and is detachably secured to the drum by round head, square neck bolts that fasten the plate to a corresponding mounting bar welded to the periphery of the drum.

The plate segments are arranged as a group of left hand feeding segments and a group of right hand feeding segments in opposite end halves of the beater. Both groups of segments thus cooperate to converge crop materials toward the middle or center at the same time that they are being propelled rearwardly toward the inlet of the axial threshing rotor. The group of segments at one end of the beater are arranged in diametrically opposed sets, with each set including at least one and preferably two or three of the segments. Groups at opposite ends of the beater are circumferentially offset 90° from one another so that, every 90° of rotation of the beater, a set of feeding segments in a different end half of the beater is presented. Preferably, an equal quantity of segments are provided at the left hand feeding end and the right hand feeding end. The lengths of the segments are such that, overall, their feeding faces effectively provide a full length feeding surface along the beater notwithstanding the fact that some of the surfaces are circumferentially offset from others.

BRIEF DESCRIPTION OF THE DRAWINGS

FIG. 1 is a fragmentary sectional elevation view of an axial flow combine with numerous parts and wall structures removed to reveal details of construction, the combine incorporating an improved beater in accordance with the principles of the present invention;

FIG. 2 is an enlarged plan view of the beater isolated from other components of the combine;

FIG. 3 is a plan view of the beater but rotated 90° from the FIG. 2 orientation;

FIG. 4 is an enlarged, end elevation view of the beater;

FIG. 5 is a schematic diagram of a flat pattern of the beater illustrating the array of the feeding segments about the circumference of the beater;

FIG. 6 is an elevation view of one of the welded mounting bars for the feeding plate segments of the beater;

FIG. 7 is a top plan view thereof;

FIG. 8 is an elevation view of a bolted feeding plate segment;

FIG. 9 is a top plan view thereof;

FIG. 10 is a fragmentary, enlarged cross section elevation view of the welded and bolted segments attached to the beater circumference; and FIG. 11 is an exploded isometric view of the welded and bolted segments showing method of attachment.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The combine 10 that is fragmentarily and sectionally shown in FIG. 1 is of the axial flow type, having a threshing rotor assembly 12 that extends fore-and-aft of the machine and is disposed laterally centrally thereof. Threshing rotor assembly 12 includes a flighted section 13 at the front to receive the crop material discharged from the beater and translate it into a rotary-helical motion for transport to the threshing and separating areas of the rotor. Flighted section 13 is surrounded by an infeed housing 14 that has an upwardly and rearwardly tapering transition inlet 16 at its lower front extremity which is specially shaped to converge the linear feed of crop material from the beater into the predescribed flighting, as well understood by those skilled in the art. Forwardly of the inlet 16 is disposed a housing 18 defining an internal transfer region 20 communicating with the inlet 16.

A crop accelerating and transferring beater 22 is located within region 20 and is supported by housing 18 for rotation about a transverse axis in a counterclockwise direction viewing FIG. 1. Means for driving beater 22 are well understood by those skilled in the art and are not shown. A stone sump or trap 24 is defined in the lower front portion of region 20 for the purpose of capturing and collecting stones that are redirected by the rotating elements of the beater 22, preventing feeding of said stones into and subsequent damage to the threshing rotor assembly 12.

A feeder housing 26 is supported on the chassis of the combine in front of housing 18 and spaced forwardly from inlet 16. Housing 26 includes a raddle chain conveyor assembly 28 having a lower run 30 that moves upwardly and rearwardly toward transition region 20 during operation as illustrated in FIG. 1. Feeder housing 26 is open at its upper rear end so that crop materials from feeder housing 26 are delivered into transfer region 20 where they are acted upon by beater 22 and accelerated into and through inlet 16 of infeed housing 14. Any one of a number of different types of crop harvesting headers (not shown) may be secured to the lower forward end of feeder housing 26 for gathering crop materials from the field as the combine is advanced and for delivering such materials into the front end of feeder housing 26, all as well understood by those of ordinary skill in the art.

Beater 22 comprises a cylindrical body 32 in the nature of a hollow drum as shown in FIGS. 1, 2, 3, and 4. A shaft 34 extends axially through drum 32 and is affixed to opposite ends thereof by a pair of hubs 36 associated with opposite end walls 38. Shaft 34 defines the axis of rotation of beater 22. Drum 32 has a plurality of plate-like feeding segments secured to the outer periphery thereof for the purpose of engaging the incoming crop material and propelling it rearwardly through transfer region 20 and, at the same time, converging it centrally for delivery to the centrally disposed inlet 16. Increasing the angle of the segments accentuates the convergence of the crop, and decreasing the angle decreases convergence and increases feed aggressiveness. In the illustrated embodiment, a total of eight segments 40 are used, although this number may vary depending upon the width of the harvester body. Each segment 40 is secured to drum 32 by means of a mounting bar 42, which is itself welded directly to drum 32 while segments 40 are bolted to bars 42.

As illustrated particularly in FIGS. 8 and 9, each segment 40 comprises a flat, untwisted plate that is generally arched in overall configuration. Segment 40 has an inner arcuate edge 44 that conforms generally to the curvature of the outer surface 46 of drum 32 when segment 40 is disposed at approximately a 40° angle on such surface 46 relative to the axis of rotation defined by shaft 34. Inner edge 44 has a clearance to the beater circumference 46 to clear the welds attaching bars 42 to surface 46. An outer edge 48 of each segment 40 extends generally concentrically of inner edge 44 so that segment 40 is essentially of constant width from one end to the opposite end thereof. It will be noted, however, that the end of segment 40 which serves as the leading end 50 thereof when the segment is secured to bar 42 is convexly arcuate so as to present a rounded leading edge for the segment. The opposite end 52, which becomes the trailing end when segment 40 is installed, is squared off so as to extend generally at right angles to the longitudinal axis of segment 40. Each segment 40 is hardened on crop-engaging face 54 and is provided with three square holes 56 along its length for receiving round head, square neck bolts 58 (FIGS. 10 and 11).

The mounting bars 42 are very similar in configuration to the segments 40. Each mounting bar 42 is, however, slightly wider than its corresponding segment 40. As illustrated particularly in FIGS. 6 and 7, each mounting bar 42 includes an inner edge 60 that conforms substantially to the curvature of drum surface 46 when bar 42 is disposed at an approximate 40° angle relative to the axis of rotation of drum 32 defined by shaft 34. Similarly, an outer edge 62 of each mounting bar 42 extends substantially concentrically to the inner edge 60 so that bar 42 is of generally constant width throughout its length. Leading end 64 is convexly rounded in a similar manner to leading end 50 of crop engaging segment 40, while trailing end 66 is squared off. Bar 42 has a flat face 68 that abuts segment 40 when the segment is installed, and three circular holes 70 are provided along the length of the bar in registration with square holes 56 for receiving the round head, square neck bolts 58. Inner edge 60 of bar 42 is adapted to bear directly against drum surface 46 as illustrated in FIG. 10 and to have fillet weld beads 72 and 74 applied to opposite sides thereof so as to securely affix bar 42 to drum 32.

In a preferred embodiment the feeding segments 40 are arranged in two groups in opposite, axial halves of the drum 32. A right-hand group is located in one half, and a left-hand group is located in the other half, with all segments 40 angled in such a manner that they converge crop centrally, toward the middle of beater 22, when beater 22 is rotated in the direction indicated by the various arrows on the figures. Each group contains two diametrically opposed sets of segments, such as the sets 76 and 78 for the left hand group of segments and the sets 80 and 82 for the right hand set of segments. Each set 76–82 contains at least one segment 40, and preferably two or more. In the illustrated embodiment, each set 76–82 includes two segments 40. The sets 76 and 78 are offset 90° circumferentially from the sets 80 and 82 such that, every 90° of travel around the beater, a set of segments from the opposite end of the drum is presented.

The segments of all sets are so arranged that their feeding faces 54 face forwardly with the respect to the direction of rotation indicated by the arrow 49 in the flat pattern of FIG. 5. Leading ends 50 of the segments 40 in sets 76 and 78 of the left-hand group are always disposed outboard of the trailing ends 52 of the segments. Correspondingly, although disposed at right angles to the segments of sets 76 and 78, the segments of right-hand sets 80 and 82 are likewise disposed with their leading ends 50 disposed outboard of their trailing ends 52. It will be noted that, in flat pattern, the segments 40 of each set are mutually parallel to one another.

It will be noted that each segment 40 is of such a length that it is only disposed within one circumferential quadrant of the drum 32. Segments 40 do not overlap in a circumferential sense as illustrated, for example, in FIG. 4. Moreover, it will be noted that although the sets of segments are staggered around drum 32 at 90° intervals, there is virtually a continuous feeding surface defined over the full length of drum 32 by the feed faces 54 of one set in the left-hand group and the feed faces 54 of another set in the right hand group. In other words, looking at the sets 76 and 80 of segments 40, for example, it will be seen that faces 54 of those segments effectively provide full coverage along the length of the drum 32. Although the segments 40 of each set do not overlap one another along the length of drum 32, they are essentially end-to-end when viewed in elevation, as are the inboard-most segments of the left-hand group and the right-hand group. Consequently, there is very little if any opportunity for crop materials to slip past the feeding segments, notwithstanding their angled-in orientations as opposed to being perpendicular to the path of travel of crop flow through the transfer region.

The symmetrical arrangement of feed segments as described above provides minimal crop pinch points and smooth, efficient operation of the beater 22. The angled faces of segments 40 provide for positive feeding and acceleration of the crop material, yet also serve to converge the material centrally as it approaches inlet 16. Crop wrapping and recycling at the beater 32 is minimized, bunches of high moisture crop material tend to be broken up, and corn cobs can pass through the spaces between adjacent segments 40 instead of being propelled by aggressive longitudinal paddles. For these and other reasons, beater 22 of the present invention provides a significant advance in the art.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A replaceable feed segment adapted for angular attachment to the cylindrical body of a rotary beater for a combine, said segment comprising a generally constant width, generally arched, untwisted flat plate lying in a single plane and having an arcuate inner edge that generally conforms to the curvature of the body of the beater, an arcuate outer edge that is generally concentric with the inner edge, and a plurality of mounting holes in the plate, said plate having a crop-engaging face, said mounting holes passing through said face, said plate further having a convex arcuate edge at a leading end thereof with respect to the direction of rotation of the beater, said arcuate edge extending from said inner edge to said outer edge.

2. A replaceable feed segment as claimed in claim 1, said plate having a squared off trailing end with respect to the direction of rotation of the beater.

3. A replaceable feed segment as claimed in claim 1, said crop-engaging face being hardened.

* * * * *